US012725077B2

(12) United States Patent
Abdulaal

(10) Patent No.: US 12,725,077 B2
(45) Date of Patent: Sep. 1, 2026

(54) MACHINE LEARNING-BASED INFRASTRUCTURE ANOMALY AND INCIDENT DETECTION USING MULTI-DIMENSIONAL MACHINE METRICS

(71) Applicant: eBay Inc., San Jose, CA (US)

(72) Inventor: Ahmed Reda Mohamed Saeid Abdulaal, San Jose, CA (US)

(73) Assignee: eBay Inc., San Jose, CA (US)

( * ) Notice: Subject to any disclaimer, the term of this patent is extended or adjusted under 35 U.S.C. 154(b) by 1029 days.

(21) Appl. No.: 17/893,407

(22) Filed: Aug. 23, 2022

(65) Prior Publication Data

US 2022/0405645 A1 Dec. 22, 2022

Related U.S. Application Data

(63) Continuation of application No. 16/248,221, filed on Jan. 15, 2019, now Pat. No. 11,455,570.

(51) Int. Cl.
*G06N 20/00* (2019.01)
*G06N 7/01* (2023.01)

(52) U.S. Cl.
CPC ............... *G06N 20/00* (2019.01); *G06N 7/01* (2023.01)

(58) Field of Classification Search
None
See application file for complete search history.

(56) References Cited

U.S. PATENT DOCUMENTS

| | | | |
|---|---|---|---|
| 7,096,153 | B2 | 8/2006 | Guralnik et al. |
| 9,110,984 | B1 | 8/2015 | Lewis et al. |
| 9,349,103 | B2 | 5/2016 | Eberhardt, III et al. |
| 9,781,150 | B1 | 10/2017 | Zhaov et al. |
| 10,135,863 | B2 | 11/2018 | Dennison et al. |
| 2012/0041575 | A1 | 2/2012 | Maeda et al. |
| 2014/0143186 | A1 | 5/2014 | Bala |

(Continued)

OTHER PUBLICATIONS

U.S. Appl. No. 16/248,221 , "Final Office Action received for U.S. Appl. No. 16/248,221, mailed on Oct. 29, 2021", Oct. 29, 2021, 39 Pages.

(Continued)

*Primary Examiner* — David R Vincent
(74) *Attorney, Agent, or Firm* — FIG. 1 Patents

(57) ABSTRACT

A machine learning ("ML") pipeline that includes unsupervised learning, supervised learning, and Bayesian learning is utilized to train a ML classifier that can classify machine metrics as being indicative of an anomaly. A boosting process can be utilized during the unsupervised learning portion of the ML pipeline that scores clusters of training data for completeness, and further splits clusters of training data based upon the completeness scores in order to optimize the clustering of the training data. Supervised learning is then performed on the cluster-labeled training data. Bayesian learning can also be utilized to assign incident probability inferences to the clusters of training data. Once the ML classifier has been trained, the ML classifier can be utilized in a production environment to classify multi-dimensional machine metrics generated by computing devices in the production environment as being indicative of an anomaly.

20 Claims, 9 Drawing Sheets

(56) References Cited

U.S. PATENT DOCUMENTS

| | | | | |
|---|---|---|---|---|
| 2014/0279757 | A1* | 9/2014 | Shimanovsky ....... | H04W 4/029 706/12 |
| 2015/0150011 | A1 | 5/2015 | Fischetti et al. | |
| 2016/0019338 | A1* | 1/2016 | Chudova ................ | G16B 30/10 702/20 |
| 2016/0217201 | A1 | 7/2016 | Hummel et al. | |
| 2016/0342903 | A1 | 11/2016 | Shumpert | |
| 2018/0165554 | A1* | 6/2018 | Zhang ................... | G06F 18/214 |
| 2019/0205828 | A1 | 7/2019 | O'Hara et al. | |
| 2020/0111030 | A1* | 4/2020 | Starosta ................... | G06N 5/01 |
| 2020/0226490 | A1 | 7/2020 | Abdulaal | |

OTHER PUBLICATIONS

U.S. Appl. No. 16/248,221 , "Non Final Office Action Received for U.S. Appl. No. 16/248,221, mailed on May 19, 2021", May 19, 2021, 35 Pages.

U.S. Appl. No. 16/248,221, "Notice of Allowance", U.S. Appl. No. 16/248,221, Jul. 18, 2022, 9 pages.

Cherkasova , et al., "Automated Anomaly Detection and Performance Modeling of Enterprise Applications", ACM Transactions on Computer Systems, vol. 27, No. 3, Article 6, Nov. 2009, 32 Pages.

Chrome , "Matt's Home Page", Retrieved from the Internet URL :<https://home.deib.polimi.it/matteucc/Clustering/tutorial_html/>, Accessed on Dec. 13, 2021, 2 Pages.

Frossyniotis , et al., "A Clustering Method Based on Boosting", Retrieved from the Internet URL :<https://www.cs.uoi.gr/~arly/papers/PRL2004.pdf>, a School of Electrical and Computer Engineering, National Technical University of Athens, Apr. 19, 2004, 14 Pages.

Grygorash , et al., "Minimum Spanning Tree Based Clustering Algorithms", University of South Alabama, Nov. 2006, 9 Pages.

Hu , et al., "An Embedding Approach to Anomaly Detection", 2016 IEEE 32nd International Conference on Data Engineering (ICDE), May 2016, 12 Pages.

Shekhar , "Principal Component Analysis (PCA) in R", Retrieved from the Internet URL :<https://datascienceplus.com/principal-component-analysis-unsupervised-learning/>, Feb. 15, 2018, 7 Pages.

Steinbach , et al., "A Comparison of Document Clustering Techniques", Department of Computer Science and Egineering, University of Minnesota, May 23, 2000, 20 Pages.

Zhao , et al., "k-means: A revisit", Neurocomputing 291, May 2018, 19 Pages.

* cited by examiner

MACHINE LEARNING-BASED INFRASTRUCTURE ANOMALY AND INCIDENT DETECTION USING MULTI-DIMENSIONAL MACHINE METRICS

RELATED APPLICATIONS

This application is a continuation of and claims priority to U.S. patent application Ser. No. 16/248,221, filed Jan. 15, 2019, entitled "Machine Learning-Based Infrastructure Anomaly And Incident Detection Using Multi-Dimensional Machine Metrics," the disclosure of which is hereby incorporated by reference in its entirety.

BACKGROUND

Anomaly detection is a data-mining technique for identifying unusual patterns in data that do not conform to expected behavior. In the computing domain, anomaly detection is commonly utilized to identify incidents impacting the operation of a computing devices or network components (which might be referred to herein as "infrastructure components" or, simply, "infrastructure"). For example, anomaly detection might be utilized to identify unusual patterns in network traffic that indicate unauthorized access to a computing network or other infrastructure components.

Anomaly detection techniques commonly utilize supervised or unsupervised machine learning ("ML") and statistical methods. Supervised ML techniques for anomaly detection require training data that describes historical anomalies and corresponding values for audited metrics. This information might not be available, however. For example, this type of training data is not generally available in the case of incidents affecting infrastructure that do not quickly correlate with radical changes in audited metrics. These types of incidents are commonly referred to as "slow-bleeding" incidents. Training data might also be unavailable that describes historical anomalies in metrics caused by incidents that affected only a small number of users.

In the case of "slow-bleeding" incidents, metrics can deviate from expected values over the course of hours, days, or longer time periods, thereby making it extremely difficult to identify these types of incidents using conventional ML techniques. Consequently, many "slow-bleeding" incidents might never be detected and, as a result, little or no training data will be available for use in supervised training of a classification model for detecting such incidents. Unsupervised machine learning techniques for anomaly detection typically utilize clustering or statistical outlier detection methods (e.g. standard deviation), which also suffer many shortcomings.

It is with respect to these and other technical considerations that the disclosure made herein is presented.

SUMMARY

Technologies are described herein for ML-based infrastructure anomaly and incident detection using multi-dimensional machine metrics. Generally described, the technologies disclosed herein address the technical problems presented above, and potentially others, by providing a ML pipeline configured to train a ML classifier capable of classifying machine-generated metrics as being indicative of an anomaly. The ML classifier can be utilized in a production environment to identify and resolve incidents impacting infrastructure components.

Through implementations of the disclosed technologies, certain types of incidents impacting infrastructure can be identified, such as "slow-bleeding" incidents, that might not be identifiable using conventional anomaly detection techniques. Once an incident has been identified using the technologies disclosed herein, remedial action can be taken to end the incident and prevent future occurrences of similar incidents. Other technical benefits not specifically mentioned herein can also be realized through implementations of the disclosed technologies.

In order to provide the technical benefits described above, and potentially others, the technologies disclosed herein can be utilized to train a ML classifier using unlabeled training data that includes multi-dimensional machine metrics generated by computing devices. For example, the training data might include a multitude of metrics generated by infrastructure components, such as server computers in a server farm. Examples of training data include, but are not limited to, metrics describing processor utilization, memory utilization, network utilization, error counts, transactions per second ("TPS"), |JAVA garbage collection overhead ("JGCOVH"), and load balancer stacked connections. The training data can include other types of metrics generated by other types of infrastructure components in other configurations.

In order to train the ML classifier, unsupervised machine learning is performed on the unlabeled training data to cluster the training data. A "boosting process" is performed during clustering to enhance the clustering process without requiring a user to specify the number of clusters or maximum sample distances as with conventional clustering methods (e.g. k-means and DBSCAN). Through this process, the unlabeled training data can be clustered into clusters of various shapes and densities.

During the boosting process, clusters of training data are analyzed to determine if they are candidates for splitting into multiple clusters. A completeness score is then computed for clusters that are candidates for splitting. The completeness score indicates whether a cluster is complete and should not be split or is not complete and should be split. The completeness score for each cluster can be computed by determining whether the distance between instances of training data in a selected cluster are approximately similar in length to a median non-zero distance between instances of training data in the cluster.

Additional unsupervised learning can then be performed in order to split clusters that are not complete. A merging process can also be performed to combine complete clusters having a high proximity to one another to avoid over-clustering (i.e. over-fitting). Cluster labels can then be assigned to the clusters.

Once the training data has been clustered in the manner described above, supervised machine learning can be performed on the cluster-labeled training data to train the ML classifier. In some configurations, Bayesian learning is also performed on the cluster-labeled training data to assign incident probability inferences to the clustered training data. The incident probability inferences can be generated or updated through an offline user input as described in later sections. The incident probability inferences can be utilized to trigger remedial actions or other specified actions, including alerting human operators. Such a trigger can initiate cluster splits or merges during a periodic model update process, described below.

Once the ML classifier has been trained in the manner described above, the ML classifier can be deployed to a production environment for use in classifying production machine metrics generated by computing devices in the production environment as being indicative of anomalies. When an anomaly is detected, a further determination can be made as to whether the anomaly is indicative of an incident impacting infrastructure components in the production environment. If an incident is detected, remedial action can be taken to end the incident and prevent future occurrences of similar incidents.

In one configuration, additional training data is obtained by providing an interface through which a user can confirm or reject classifications of production machine metrics made by the ML classifier. For example, and without limitation, data indicating the anomaly-to-incident likelihood for machine metrics can be presented in a user interface ("UI"). A user can then provide an indication by way of the UI indicating whether the instance of the machine metrics indicates or does not indicate an incident. This indication can be utilized to perform further supervised training of the ML classifier, including updating the incident likelihood associated with a cluster and, on a scheduled basis, perform additional training by further splitting or merging clusters to maximize the incident likelihood of anomaly clusters.

It should be appreciated that the subject matter described above and in further detail below can be implemented as a computer-controlled apparatus, a computer-implemented method, a computing device, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying FIGS. In the FIGS., the left-most digit(s) of a reference number identifies the FIG. in which the reference number first appears. The same reference numbers in different FIGS. indicate similar or identical items.

DETAILED DESCRIPTION

The following Detailed Description presents technologies for ML-based infrastructure anomaly and incident detection using multi-dimensional machine metrics. As will be discussed in greater detail below, a ML pipeline is disclosed that includes unsupervised learning, supervised learning, and Bayesian learning. The disclosed ML pipeline can be utilized to train a ML classifier that can classify machine metrics as being indicative of an anomaly. A boosting process can be utilized during the unsupervised learning portion of the ML pipeline that scores clusters of training data for completeness, and further splits clusters of training data based upon the completeness scores in order to optimize the clustering of the training data.

Once the training data has been clustered, supervised learning can be performed on the cluster-labeled training data. Bayesian learning can also be utilized to assign incident probability inferences to the clusters of training data. Once the ML classifier has been trained, the ML classifier can be utilized in a production environment to classify machine metrics generated by computing devices in the production environment as being indicative of an incident. Once an incident has been identified using the technologies disclosed herein, remedial action can be taken to end the incident and prevent future occurrences of similar incidents. Other technical benefits not specifically mentioned herein can also be realized through implementations of the disclosed technologies.

It is to be appreciated that while the technologies disclosed herein are primarily described in the context of identifying anomalies in multi-dimensional machine metrics that are indicative of incidents impacting infrastructure components, the technologies described herein can be utilized to identify anomalies in other types of data in other configurations. Other configurations will be apparent to those of ordinary skill in the art.

Figure 1:
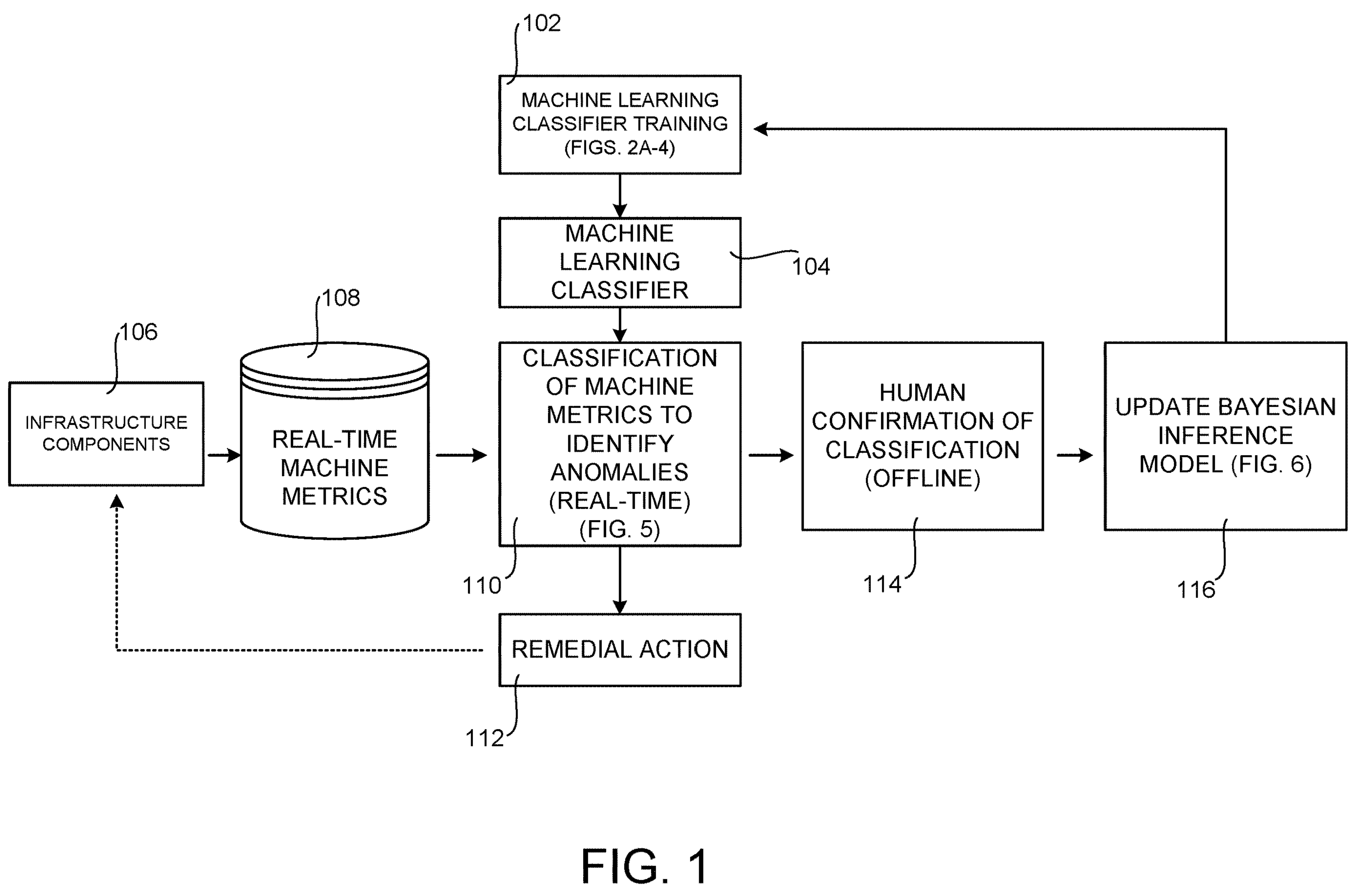
FIG. 1 is a computing system architecture diagram showing an overview of a system disclosed herein for ML-based infrastructure anomaly and incident detection using multi-dimensional machine metrics.

FIG. 1 is a computing system architecture diagram showing an overview of a system disclosed herein for ML-based infrastructure anomaly and incident detection using multi-dimensional machine metrics. In order to provide the technical benefits described above, and potentially others, ML classifier training 102 can be performed to train a ML classifier 104. The ML classifier training 102 is performed using unlabeled training data that includes multi-dimensional machine metrics generated by infrastructure components. The pipeline utilized to train the ML classifier 104 can include unsupervised learning, supervised learning, and Bayesian learning. Details regarding an illustrative pipeline for training the ML classifier 104 will be provided below with regard to FIGS. 2A-4.

Once the ML classifier 104 has been trained in the manner described herein, the ML classifier 104 can be deployed to a production environment for use in classification 110 of real-time machine metrics 108 generated by infrastructure components 106 in the production environment as being indicative of anomalies and incidents. As will be described in greater detail herein, anomalies are identified using cluster weights generated through an unsupervised learning process. Cluster weights are continuously updated in during runtime of the ML classifier 104. As will also be described in greater detail below, incidents are inferred through supervised Bayesian learning. Incident inferences are periodically updated through user feedback, as discussed in further detail below.

As mentioned briefly above, if an incident is detected that is impacting the infrastructure components 106, remedial action 112 can be taken to end the incident and prevent future occurrences of similar incidents. For example, and without limitation, impacted server computers might be restored to their most recent healthy state, rebooted, initialized, or otherwise reconfigured. Remedial action can also include transmitting an alert to a system administrator. In response thereto, the administrator can interfere, inspect, and perform any required maintenance. Details regarding one illustrative implementation of the trained ML classifier 104 in a production environment will be described below with regard to FIG. 5.

In one configuration, additional training data is obtained through human confirmation 114 or rejection of classifications made by the ML classifier 104. In these configurations, an interface can be provided through which a user can confirm or rej ect classifications of real-time machine metrics 108 made by the ML classifier 104. For example, and without limitation, data identifying real-time machine metrics 108 classified as an anomaly cluster of high incident likelihood can be presented in a UI. A user can then provide an indication by way of the UI indicating whether the real-time machine metrics 108 indicate or do not indicate an incident. This indication can be utilized to perform additional supervised training of the ML classifier 104 such as, for example, updating 116 incident probability inferences generated using Bayesian learning. Additional details regarding this process will be provided below with regard to FIG. 6.

Figure 2A:
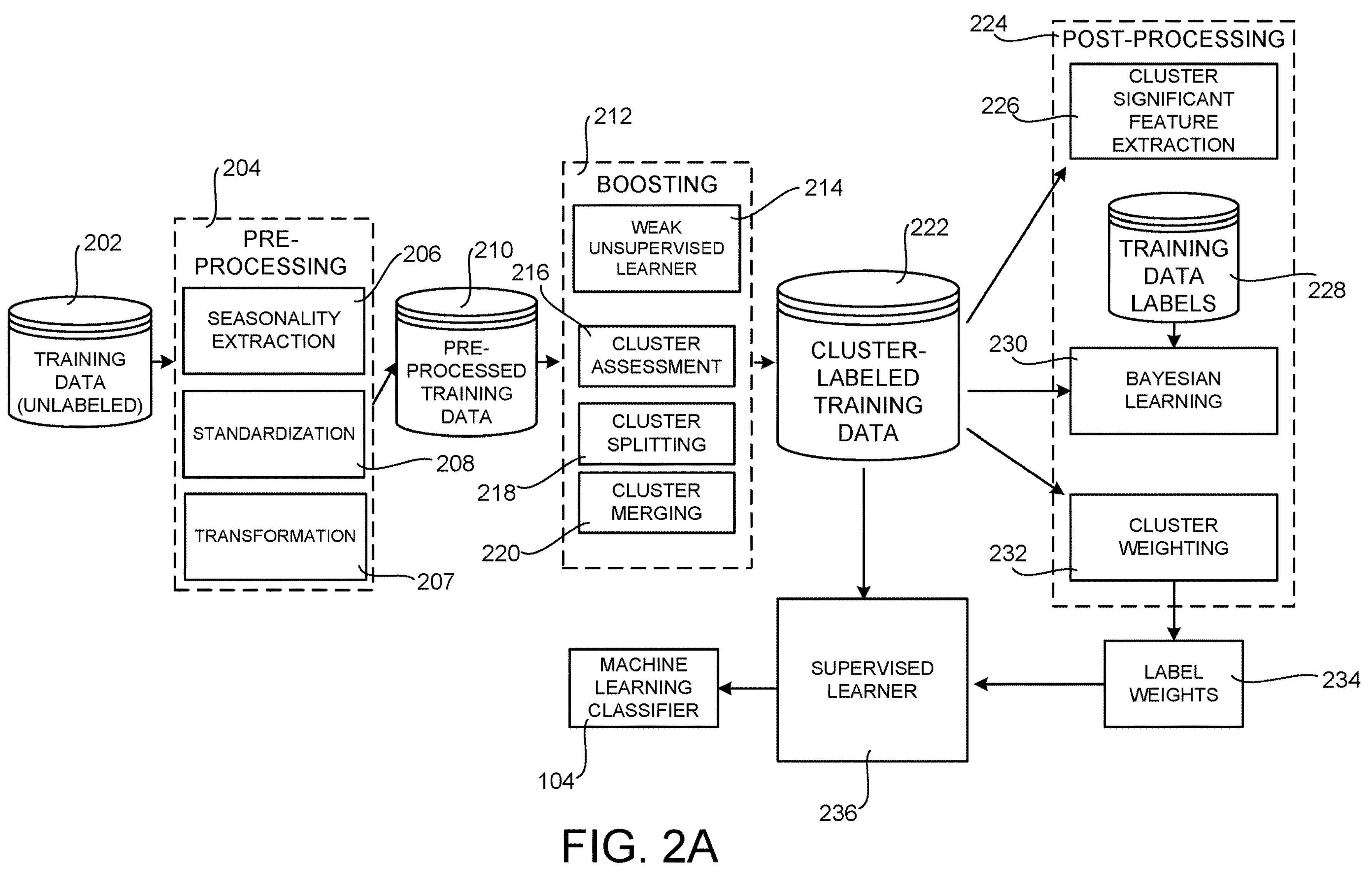
FIG. 2A is a computing system architecture diagram showing aspects of the configuration and operation of a system disclosed herein for training a ML classifier using multi-dimensional machine metrics.

FIG. 2A is a computing system architecture diagram showing aspects of the configuration and operation of a system disclosed herein for training a ML classifier 104 using multi-dimensional machine metrics. As shown in FIG. 2A and described briefly above, the pipeline shown in FIG. 2A can include unsupervised learning, supervised learning, and Bayesian learning. Supervised learning is performed by a weak unsupervised learner 214 using unlabeled training data 202.

The unlabeled training data 202 is not clustered or otherwise labeled as being indicative of an anomaly or incident. Labels are not utilized with the training data 202 at least in part because labels commonly include human errors or are simply unavailable. Furthermore, incidents might have occurred previously that were not discovered and, consequently, the training data 202 corresponding to the incidents would not be labeled.

The unlabeled training data 202 is multi-dimensional in that it includes a multitude of machine metrics generated by infrastructure components, such as server computers in a server farm. Examples of training data include, but are not limited to, metrics describing processor utilization, memory utilization, network utilization, error counts, TPS, JGCOVH, and LB stacked connections. The unlabeled training data 202 can include other types of metrics generated by other types of computing devices in other configurations.

Prior to performing unsupervised learning on the unlabeled training data 202, pre-processing 204 of the unlabeled training data 202 is performed. Pre-processing 204 can include, but is not limited to, seasonality extraction 206, standardization 208, and mathematical transformations 207 (e.g. log transformation). Seasonality extraction 206 extracts periodic patterns from the unlabeled training data 202 as a function of time. Seasonality extraction 206 can eliminate deviations in the unlabeled training data 202 that are due to expected trends such as, for example, metrics generated during weekends or at night.

Standardization 208 fits a data standardization function to the multi-dimensional unlabeled training data 202 to remove bias. Standardization 208 can improve the process of anomaly identification without biasing scaled values for normal behavior. Other types of pre-processing 204 can be performed in the unlabeled training data 202 in other configurations.

Once the unlabeled training data 202 has been pre-processed, the pre-processed training data 210 can be clustered and boosted using a weak unsupervised learner 214. This process, which is described in greater detail below, clusters the pre-processed training data 210 to generate cluster-labeled training data 222.

The cluster-labeled training data 222 includes labels indicating the probability (i.e. the size of a cluster relative to the size of the full data set) that a particular cluster of training data is anomalous. Detected anomalies can first be used as incident indicators, when no other indicators are available (e.g. when historical labels are unavailable). This changes over time and updates periodically as users send their feedback through the UI described below.

The labels can be utilized to infer a relationship between an anomaly detected in machine metrics and an incident causing the anomaly. The labels can also identify the set of metrics contributing to each cluster (i.e. feature extraction), which can be utilized during a root cause analysis for an incident. As described in greater detail below, the probabilities are updated continuously in runtime as new observations are classified. This enables the classification process to adapt over time to changes in machine metrics due to, for example, a hardware upgrade.

In one configuration, the weak unsupervised learner 214 utilizes k-means clustering, where K=2, restarts=20, and iterations=30. Other unsupervised learning techniques can be utilized to cluster the pre-processed training data 210 in other configurations.

Boosting 212 is performed during clustering to enhance the clustering process without requiring a user to specify the number of clusters or maximum sample distances as with conventional clustering methods (e.g. k-means and DBSCAN). Through this process, the pre-processed training data 210 can be clustered into clusters of various shapes and densities. Boosting 212 in the manner described herein is agnostic to varying cluster densities and can significantly improve clustering and auto-detect the number of clusters in the pre-processed training data 210.

During boosting 212, cluster assessment 216 is performed on the clusters of training data in order to determine if each cluster is a candidate for splitting into multiple clusters. A completeness score is then computed for clusters to identify candidates for splitting. The completeness score indicates whether a cluster is complete and should not be split or is not complete and should be split. As will be described in great detail below, the completeness score for each cluster can be computed by determining whether the distance between instances of training data in selected cluster are approximately similar in length to a median non-zero distance between instances of training data in the cluster.

Cluster splitting 218 is performed for those clusters that are deemed not to be complete based upon the completeness score. In particular, the weak unsupervised learner 214 can perform additional unsupervised learning on clusters that are not complete in order to split those clusters. Cluster merging 220 can also be performed to combine complete clusters having a high proximity to one another to avoid over-clustering (i.e. over-fitting). This can be the case with non-convex pre-clustered shapes or very high-dimensional datasets. Cluster labels can then be assigned to the identified clusters to generate the cluster-labeled training data 222. Additional details regarding the boosting process 212 are provided below with regard to FIGS. 3A-4.

Once the training data 202 has been clustered in the manner described above, post-processing 224 can be performed on the cluster-labeled training data 222. In one configuration, for example, a supervised learner 236 can perform supervised machine learning on the cluster-labeled training 222 data to train a ML classifier 104. For example, in one configuration the supervised learner 236 fits the cluster-labeled training data to a classification tree. Other supervised ML techniques can be utilized in other configurations such as, but not limited to, a support vector machine ("SVM").

Cluster weighting 232 can also be performed to assign weights 234 to the clusters. The weights 234 can be computed as a function of the number of observations that fell into a specific cluster during unsupervised learning versus the number of observations in the entire data set. In this way, a higher weight 234 can be assigned to clusters containing metrics with a lower probability of occurrence. The weights 234 can assist in providing an anomaly score/rank for each cluster and can also improve the accuracy of the ML classifier 104 by protecting against bias. The weights 234 are provided to the supervised learner 236.

In some configurations, post-processing 224 also includes feature extraction 226. During feature extraction 226, the centroid values of each cluster is recorded to provide a means of hot-metric detection. In particular, each cluster will have a unique combination of standardized metric values indicating which metrics in the cluster are both significantly far from the norm and significantly different than other clusters. Root cause rules generated during feature extraction 226 can provide initial insights during a root-cause analysis when an anomaly is detected, or an incident is inferred.

In some configurations, labels 228 are available for instances of the training data 202 and 210. For, example, labels can be collected in the manner described above with regard to FIG. 1 using human confirmation 114. The labels 228 can indicate whether a particular cluster is representative of an incident. In these configurations, Bayesian learning 230 can be performed on the cluster-labeled training data 222 using the training data labels 228 to assign incident probability inferences to the clustered-labeled training data 222. As will be described in greater detail below with regard to FIG. 5, the incident probability inferences can be utilized for triggering remedial action.

Figure 2B:
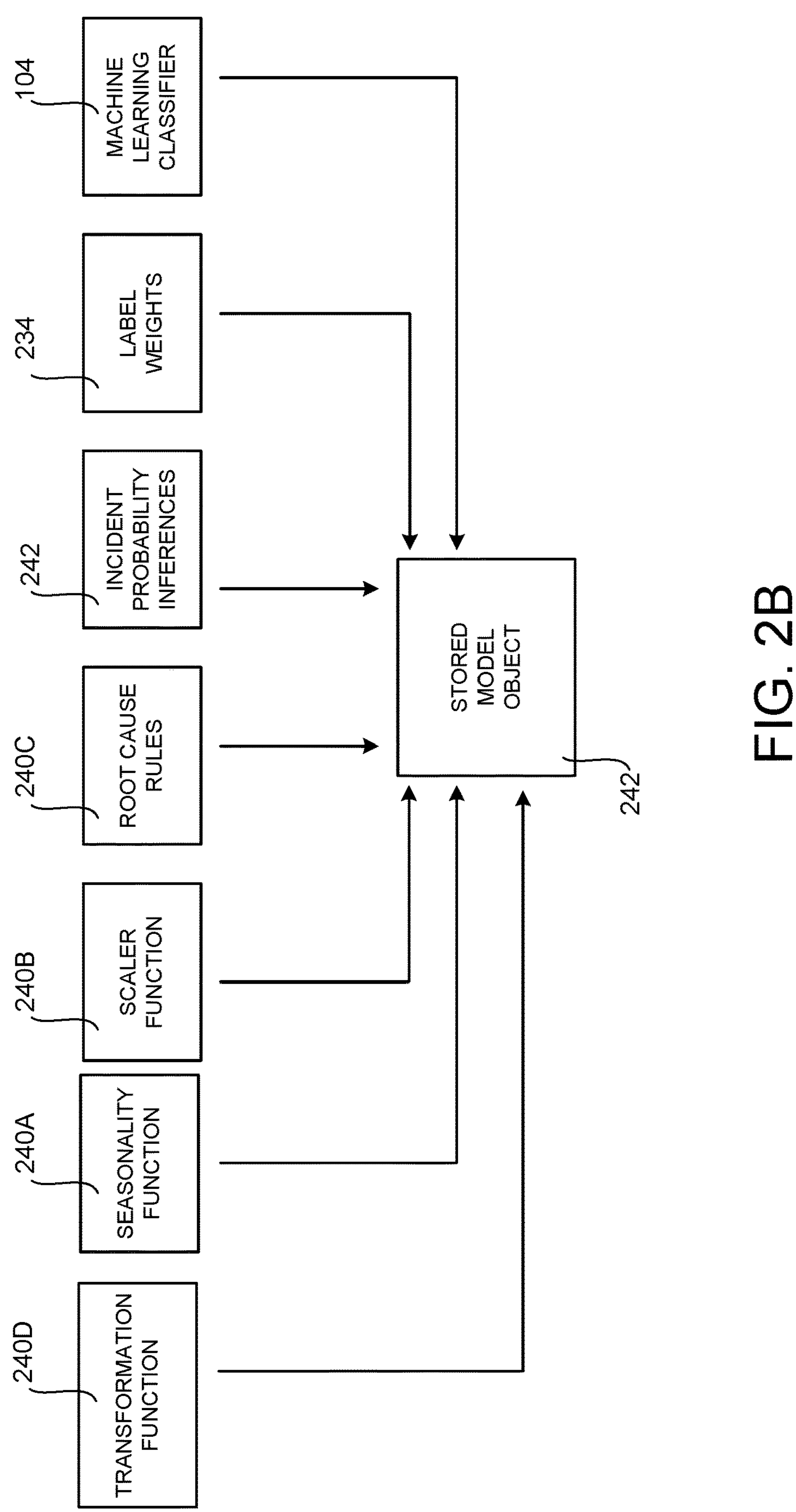
FIG. 2B is a data structure diagram showing aspects of the configuration of a stored model object utilized in embodiments disclosed herein for ML-based anomaly and incident detection.

FIG. 2B is a data structure diagram showing aspects of the configuration of a stored model object 242 (e.g. a binary pickled object) generated by the pipeline shown in FIG. 2A and utilized in embodiments disclosed herein for ML-based anomaly and incident detection. As shown in FIG. 2B, the stored model object 242 can include data 240A identifying the seasonality function utilized at training time during seasonality extraction 206. The stored model object 242 can also include data 240B identifying a scaling function utilized at training time during standardization 208 and data 240D identifying a transformation function used at training time. Using the data 240A, 240B, 240C, and 240D, the same seasonality function, scaling function, and transformation function, or functions, can be selected and utilized at run-time to perform pre-processing on real-time machine metrics 108 prior classification.

The stored model object 242 can also include root cause rules 240C generated during feature extraction 226. As mentioned above, the root cause rules 240C to provide initial insights during a root-cause analysis when an anomaly is detected, or an incident is inferred. Use of the root cause rules 240C will be described in further detail below with regard to FIG. 5.

The stored model object 242 can also include incident probability inferences 240D generated during Bayesian learning 230, the label weights 234 generated by cluster weighting 232, and a classification function describing the machine learning classifier 104 generated in the manner described above. Details regarding the utilization of the contents of the stored model object 242 for use in classifying real-time machine metrics 108 will be provided below with regard to FIG. 5.

Figure 3A:
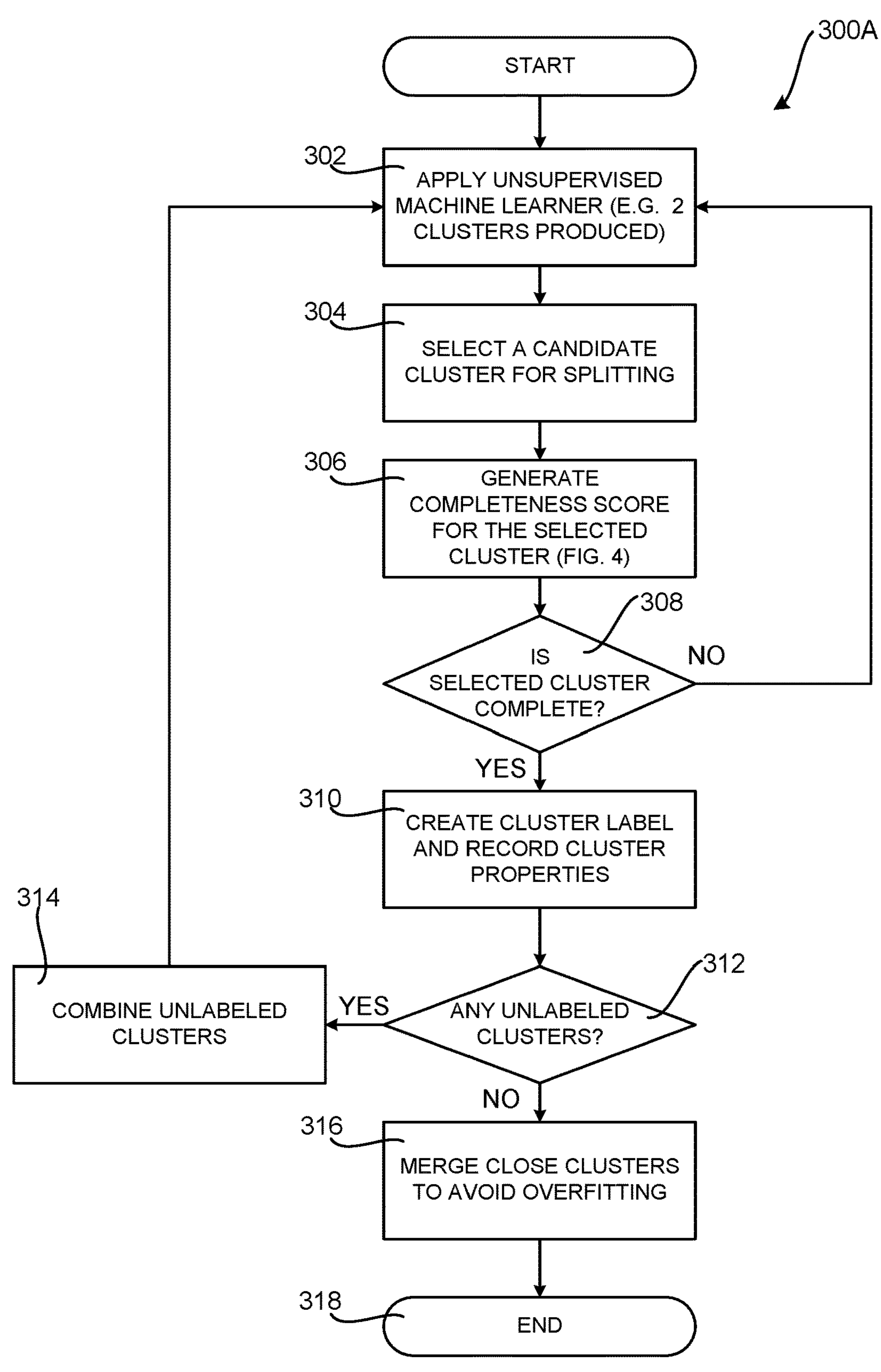
FIGS. 3A-3C are flow diagrams showing aspects of several routines disclosed herein for performing unsupervised learning on training data to generate cluster-labeled training data, according to one embodiment disclosed herein.
Figure 3B:
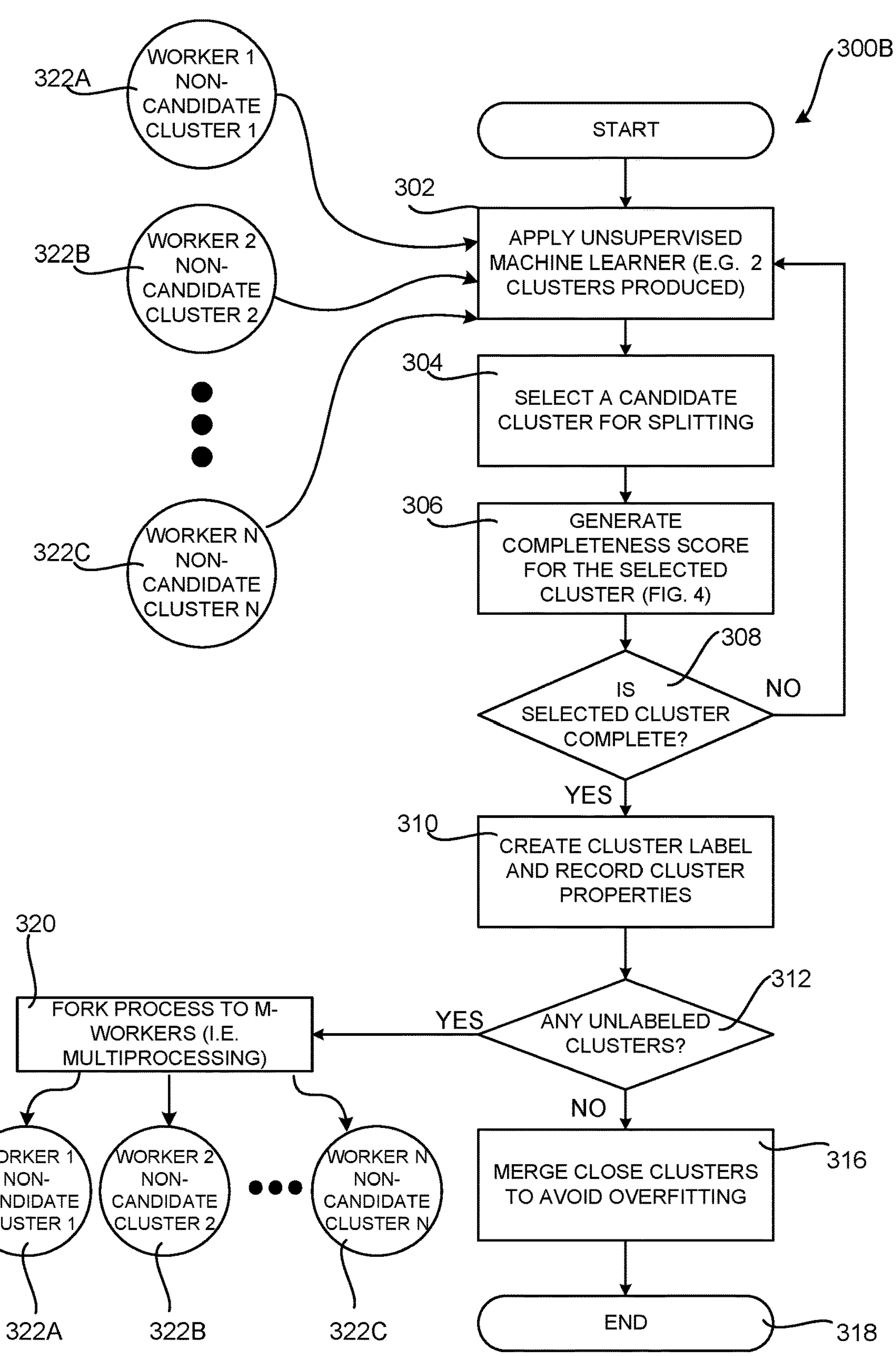
Figure 3C:
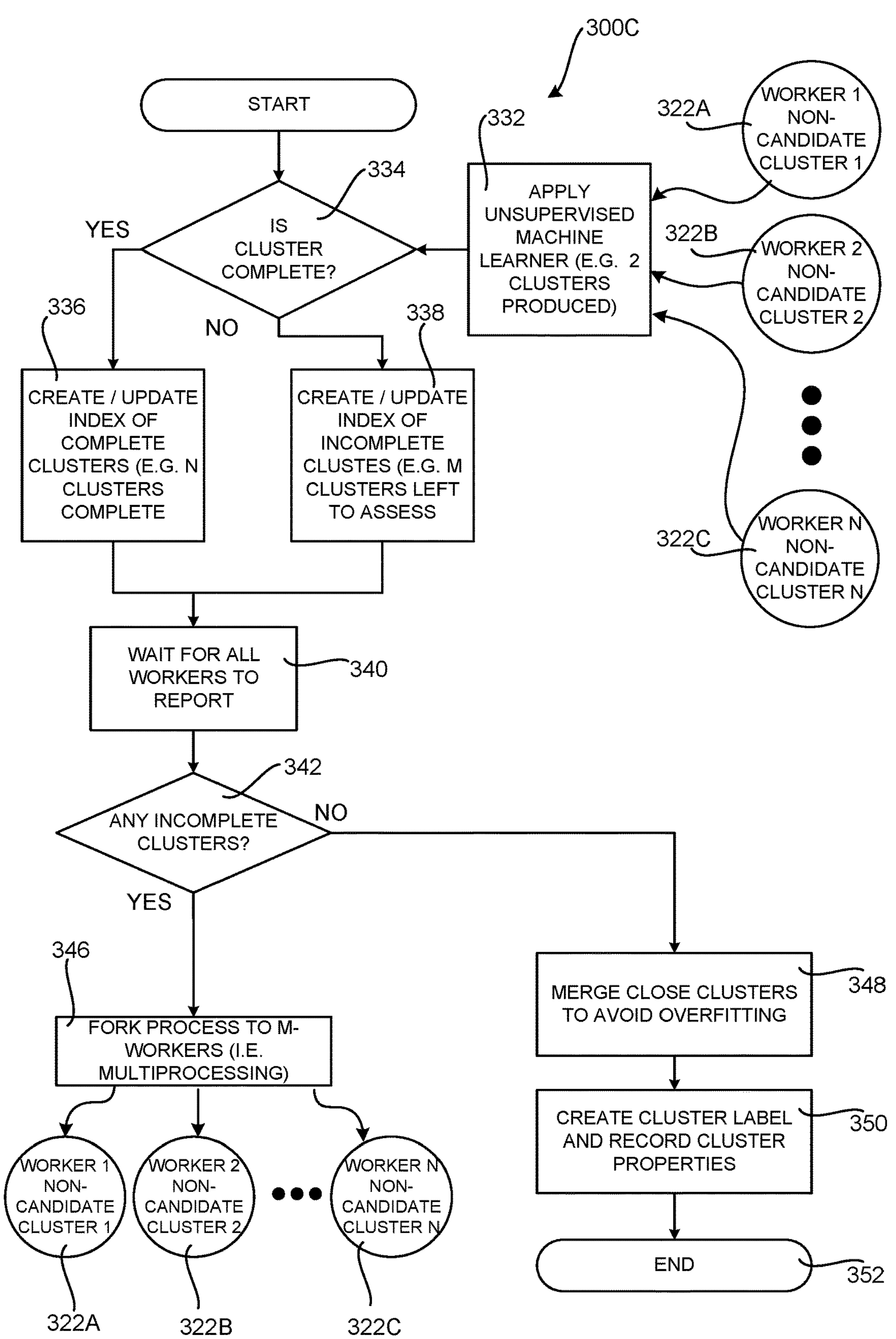

FIGS. 3A-3C are flow diagrams showing aspects of several routines 300A and 300B, respectively, disclosed herein for performing unsupervised learning on unlabeled pre-processed training data 210 to generate cluster-labeled training data 222, according to one embodiment disclosed herein. In particular, FIGS. 3A-3C illustrate aspects of the boosting process described above. As discussed above, the boosting process can enhance the clustering process without requiring a user to specify the number of clusters or maximum sample distances as with conventional clustering methods.

It should be appreciated that the logical operations described herein with regard to FIGS. 3A-3C, and the other FIGS., can be implemented (1) as a sequence of computer implemented acts or program modules running on a computing device and/or (2) as interconnected machine logic circuits or circuit modules within a computing device. The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 300A begins at operation 302, where the weak unsupervised learner 214 begins clustering the pre-processed training data 210. For example, the weak unsupervised learner 214 might initially identify several clusters. The routine 300A then proceeds from operation 302 to operation 302, where a candidate cluster is selected for splitting. In some configurations, the smallest cluster is selected for splitting. Other selection criteria can be utilized in other configurations.

From operation 304, the routine 300A proceeds to operation 306, where a completeness score is computed for the cluster selected at operation 304. Details regarding one illustrative mechanism for computing the completeness score are provided below with reference to FIG. 4.

At operation 308, a determination is made as to whether the selected cluster is complete (i.e. the cluster does not need to be split further). This determination is made in some configurations by comparing the completeness score computed at operation 306 to a pre-defined threshold value. If the selected cluster is not complete, the routine 300A proceeds from operation 308 back to operation 302, where further unsupervised learning can be performed to split the selected cluster into additional clusters. If the selected cluster is complete, the routine 300A proceeds from operation 308 to operation 310.

At operation 310, a label is created for the complete cluster and other properties for the cluster might be recorded. From operation 310, the routine 300A proceeds to operation 312, where a determination is made as to whether any clusters remain to be labeled. If so, the routine 300A proceeds from operation 312 to operation 314, where any incomplete clusters are combined. The routine 300A then proceeds back to operation 302, where the process described above can be repeated.

If it is determined at operation 312 that no additional clusters remain to be labeled, the routine 300A proceeds to operation 316. At operation 316, cluster merging 220 can be performed. As discussed above, cluster merging 220 combines complete clusters having a high proximity to one another to avoid over-clustering. From operation 316, the routine 300A proceeds to operation 318, where it ends.

In some configurations, aspects of the boosting process illustrated in FIG. 3A can be performed in parallel to speed up the process, particular when implemented on systems having multiple CPUs or graphics processing units ("GPUs"). Aspects of this process are illustrated in FIG. 3B. As shown in FIG. 3B, worker computing devices 322A-322C operate in parallel on devices having multiple processing units (e.g. CPUs or GPUs) to perform clustering of the pre-processed training data 210 by performing portions of the routine 300A described above. In a parallel training configuration, however, processes are forked at operation 320 in response to determining that clusters remain to be labeled at operation 312. In this manner, clustering processes can be forked, thereby enabling the workers 322A-322C to operate in parallel. This can speed up the boosting process as compared to the implementation shown in FIG. 3A.

FIG. 3C shows a routine 300C illustrating another parallel implementation for the boosting process shown in FIG. 3A. In this implementation, the workers 322A-322C perform unsupervised learning at operation 332 to generate clusters of training data. If a cluster is complete, the routine 300C proceeds from operation 334 to operation 336, where an index of the complete clusters is created or updated and an entry is added to the index to indicate that the cluster is complete. If the cluster is not complete, the routine 334 routine 300C proceeds from operation 334 to operation 338, where a where an index of the incomplete clusters is created or updated and the current cluster is added to the index. The routine 300C then proceeds from operations 336 and 338 to operation 340.

Once all of the workers 322 have reported, the routine 300C proceeds from operation 340 to operation 342. At operation 342, a determination is made as to whether any of the clusters are incomplete. If so, the routine 300C proceeds from operation 342 to operation 346, where processes are forked to continue clustering the training data in the manner described above. If not, the routine 300C proceeds from operation 342 to operation 348, where clusters can be merged to avoid overfitting and to operation 350, where cluster labels are created and cluster properties are recorded. The routine 300C then proceeds from operation 350 to operation 352, where it ends.

Figure 4:
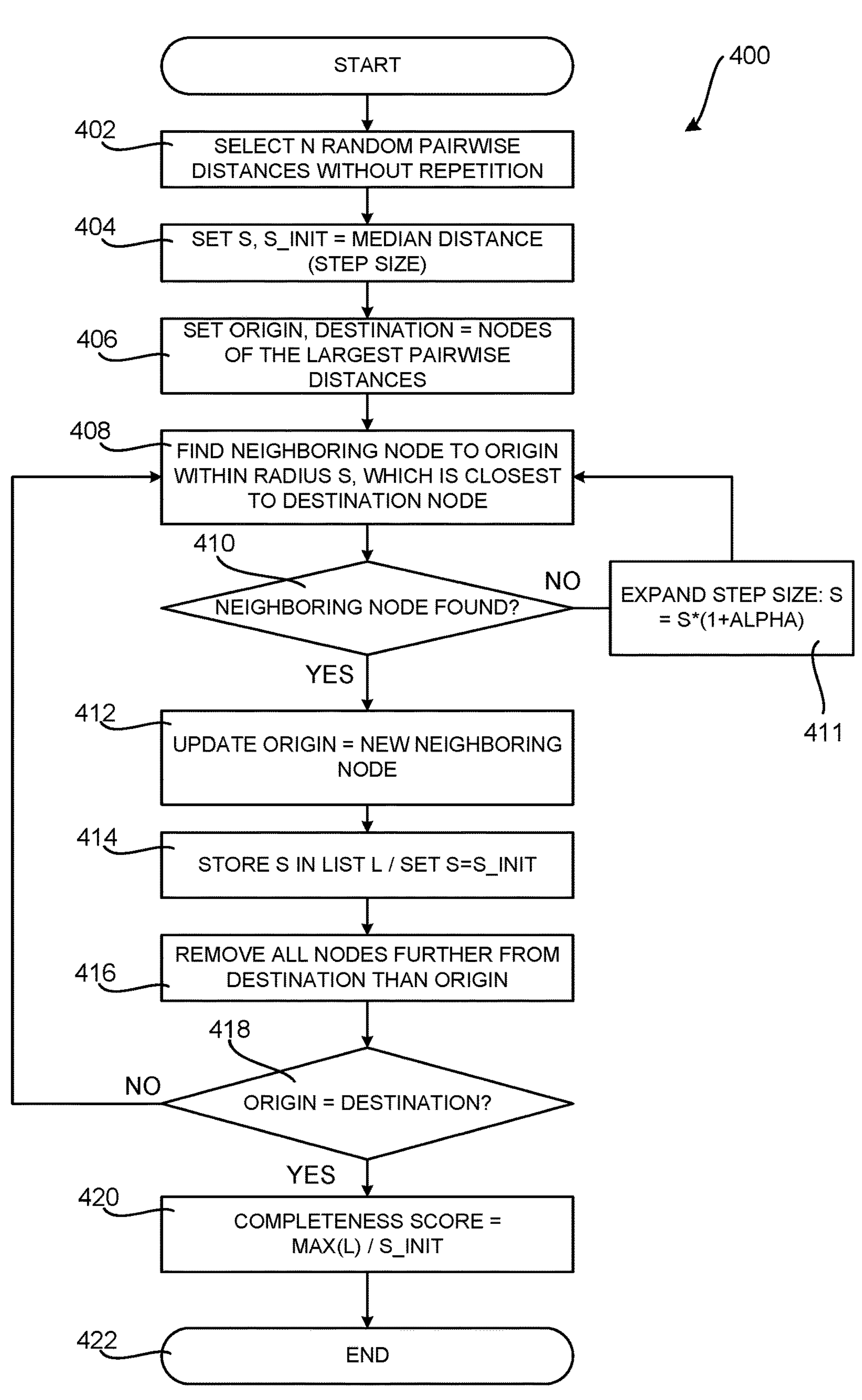
FIG. 4 is a flow diagram showing aspects of a routine disclosed herein for computing a completeness score for use in determining whether a cluster of training data is complete or incomplete.

FIG. 4 is a flow diagram showing aspects of a routine 400 disclosed herein for computing a completeness score for use in determining whether a cluster of training data is complete or incomplete. The routine 400 begins at operation 402, where N random pairwise distances between instances of training data (also referred to as "nodes") in the current cluster are selected, without repetition. The routine 400 then proceeds from operation 402 to operation 404, where variables S and S_INIT are set to the median of the pairwise distances selected at operation 404. The routine 400 then continues to operation 406, where variables ORIGIN and DESTINATION are set that identify the nodes in the current cluster of training data having the largest pairwise distance.

From operation 406, the routine 400 proceeds to operation 408, where an attempt is made to identify a node neighboring the node identified by the ORIGIN variable that is within a radius defined by S and which is closest to the node identified by the DESTINATION node. If such a neighboring node cannot be found, the routine 400 proceeds from operation 410 to operation 411, where the variable S is updated by multiplying the value of S times (1+ALPHA), where ALPHA is a pre-defined constant known as the 'learning rate.' ALPHA is the rate by which some coefficient or variable, S in this case, is iteratively updated to optimality. ALPHA is typically a small value (e.g. 0.001). The routine 400 then proceeds from operation 411 back to operation 408, where the process described above can be repeated.

If a suitable neighboring node is found at operation 410, the routine 400 proceeds to operation 412, where the ORIGIN variable is updated to identify the neighboring node. The routine 400 then proceeds from operation 412 to operation 414, where the value of S is stored in a list, L, and S is reset to S=S_INIT. The routine 400 then proceeds to operation 416, where any nodes further from the node identified by the DESTINATION variable that are further from the node identified by the ORIGIN variable are removed from consideration. This can save processor cycles and memory.

From operation 416, the routine 400 proceeds to operation 418, where a determination is made as to whether the value of the ORIGIN variable is equivalent to the value of the DESTINATION variable. If not, the routine 400 proceeds from operation 418 back to operation 408, described above. If so, the routine 400 proceeds from operation 418 to operation 420, where the completeness score for the current cluster is computed as the maximum of the S values stored in the list L and the value of S_INIT. The routine 400 then proceeds from operation 420 to operation 422, where it ends.

Figure 5:
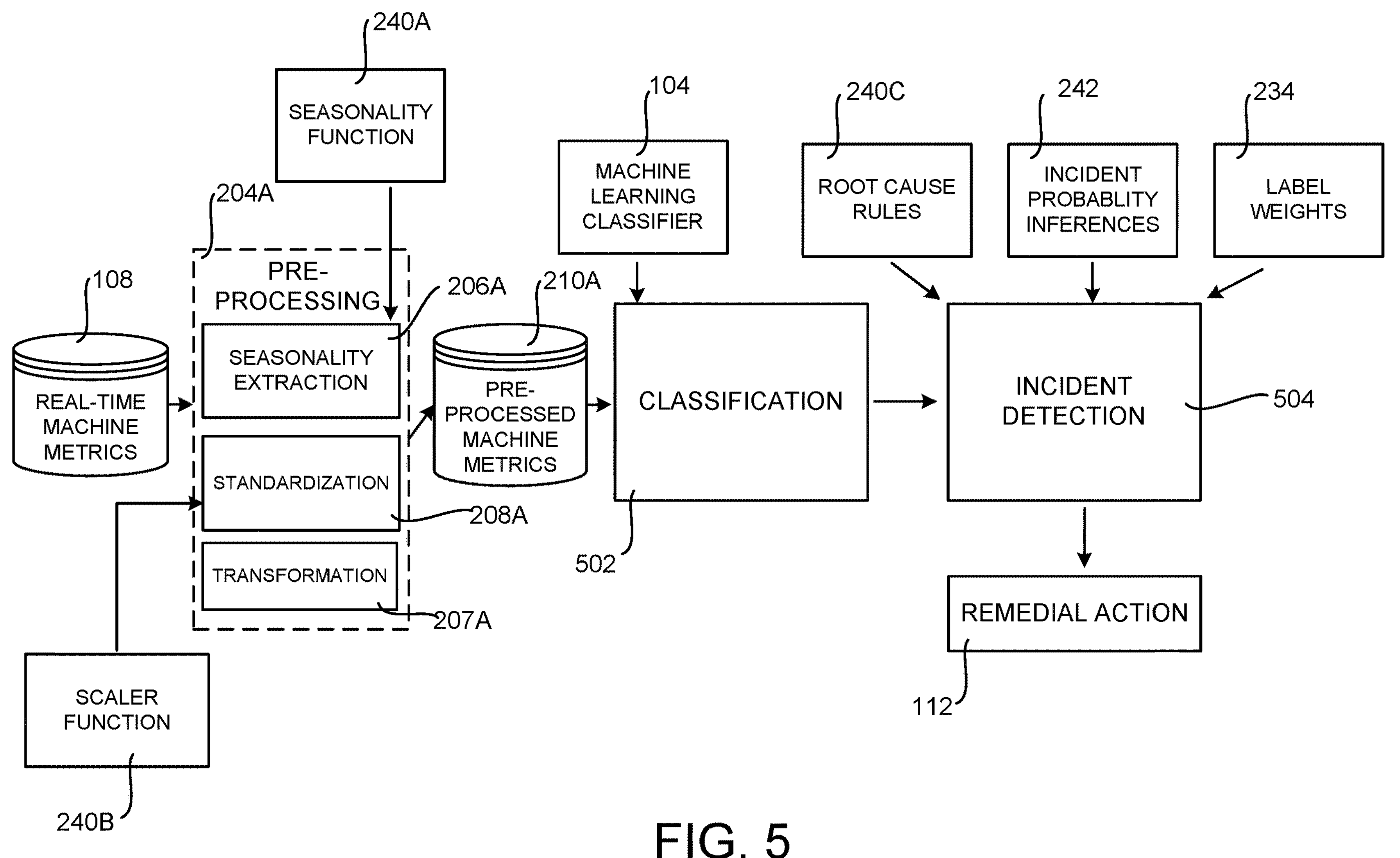
FIG. 5 is a computing system architecture diagram showing aspects of the configuration and operation of a system disclosed herein for runtime classification of production machine metrics using a ML classifier that has been trained utilizing the technologies disclosed herein.

FIG. 5 is a computing system architecture diagram showing aspects of the configuration and operation of a system disclosed herein for runtime classification of real-time machine metrics 108 generated in a production environment using a ML classifier 104 that has been trained utilizing the technologies disclosed herein. As shown in FIG. 5, pre-processing 204A is performed on the real-time machine metrics 108 in the same manner as that performed at training time. For example, the data 240A can be utilized to select a function for seasonality extraction 206A that is that same as that used during training. Similarly, the data 240B can be utilized to select a scaling function for performing standardization 208A and a transformation function for performing a transformation 207A that is the same as that used during training time. This ensures that the pre-processing performed on the real-time machine metrics 108 is the same as that performed on the data utilized to train the machine learning classifier 104.

Classification 502 is then performed on the pre-processed machine metrics 210A using the machine learning classifier 104. Classification 502 indicates if machine metrics correspond to a cluster labeled as being anomalous, where anomalies are identified using cluster weights. Classification 502 also conveys the likelihood that the machine metrics represent an incident given the cluster classification obtained. In particular, the machine learning classifier 104 classifies the pre-processed machine metrics 210A in order to identify the cluster that the machine metrics 210A belong to. After a cluster is identified, whether it indicates an anomaly or not, the label weights 234 are updated.

For an identified cluster, incident detection 504 can be performed in order to determine whether the identified cluster indicates an anomaly indicative of an incident. In particular, the label weights 234 and the incident probability inferences 242 can be utilized to determine if an anomaly is detected and whether it is representative of an incident. If so, the root cause rules 240C can be utilized to identify those metrics contributing to the incident.

As discussed above, if an incident is detected, remedial action 112 can be taken to end the incident and prevent future occurrences of similar incidents. For example, and without limitation, impacted server computers might be restored to their most recent healthy state, rebooted, initialized, or otherwise reconfigured. In other cases, the action can be to alert an expert operator to interfere, inspect, and perform maintenance operations if necessary.

As also discussed above, the incident probability inferences 242 can be updated as new incidents are identified. For example, in one configuration additional training data is obtained through human confirmation 114 or rejection of classifications made by the ML classifier 104 and/or the incident inferences made during incident detection 504. In these configurations, an interface can be provided through which a user can confirm or reject classifications of real-time machine metrics 108 made by the ML classifier 104. For example, and without limitation, data identifying real-time machine metrics 108 classified as an anomaly of high incident likelihood can be presented in a UI. A user can then, at a later time, provide an indication by way of the UI indicating whether the machine metrics 108 indicated or did not indicate a realized incident. This indication can be utilized as additional training data during further supervised training of the ML classifier 104 such as, for example, updating the incident probability inferences generated during Bayesian learning 230. This also triggers forced splitting or merging of clusters in order to maximize the incident likelihood for anomaly clusters. Over time, anomaly clusters will have high chances of representing an incident (to eliminate false-positives), while normal clusters indicate absolutely no incidents (to eliminate false negatives).

Figure 6:
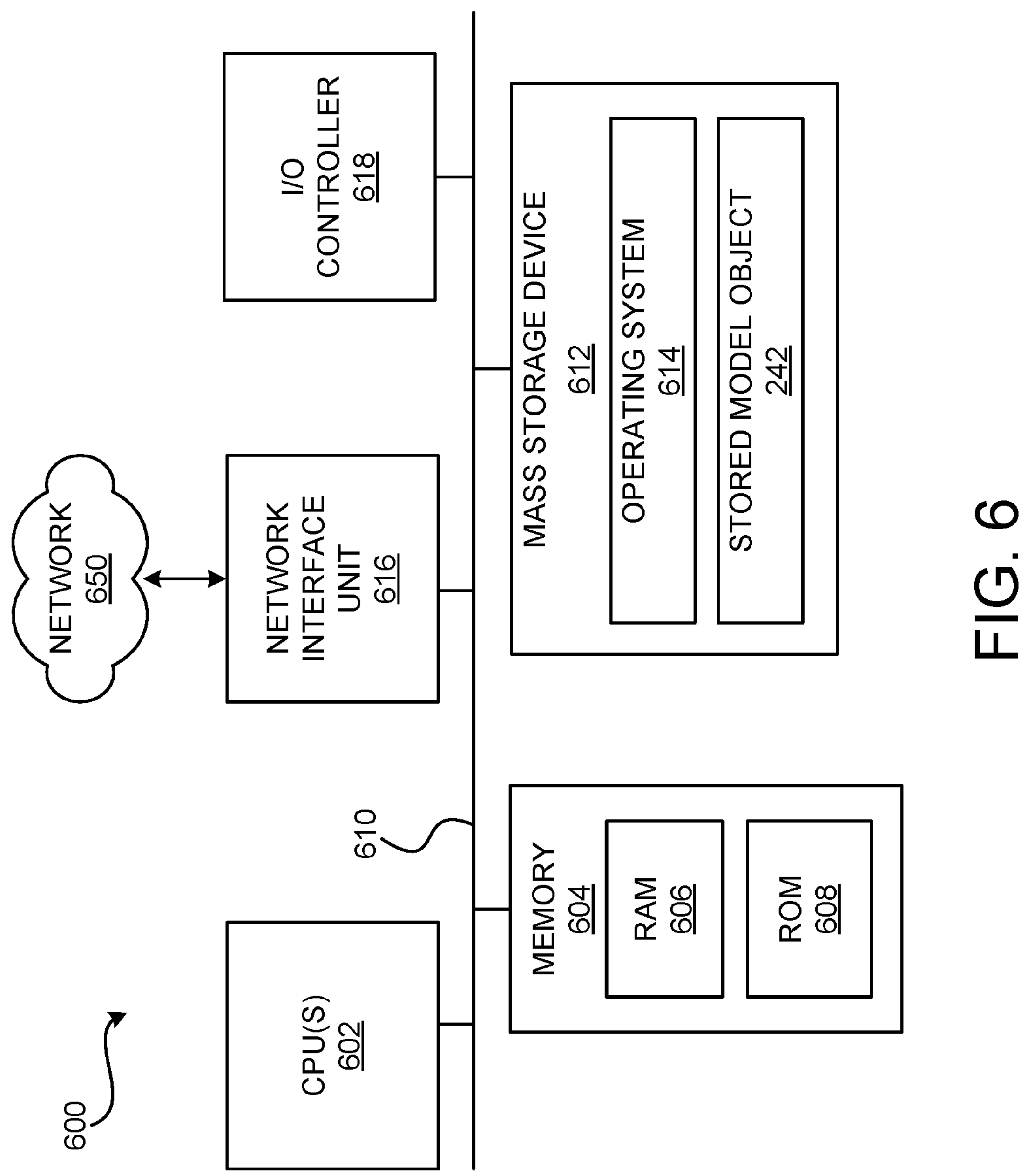
FIG. 6 is a computer architecture diagram illustrating aspects of an example computer architecture for a computer capable of executing the software components described herein.

FIG. 6 shows additional details of an example computer architecture for a computer capable of providing the functionality described herein such as, for example, a computing device configured to implement the functionality described above with reference to FIGS. 1-6. Thus, the computer architecture 600 illustrated in FIG. 6 illustrates an architecture for a server computer or another type of computing device suitable for implementing the functionality described herein. The computer architecture 600 might be utilized to execute the various software components presented herein to implement the disclosed technologies.

The computer architecture 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A firmware containing basic routines that help to transfer information between elements within the computer architecture 600, such as during startup, is stored in the ROM 608. The computer architecture 600 further includes a mass storage device 612 for storing an operating system 614, other data, and one or more application programs.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer-readable storage media might include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various implementations, the computer architecture 600 might operate in a networked environment using logical connections to remote computers through a network 650 and/or another network (not shown). A computing device implementing the computer architecture 600 might connect to the network 650 through a network interface unit 616 connected to the bus 610. It should be appreciated that the network interface unit 616 might also be utilized to connect to other types of networks and remote computer systems.

The computer architecture 600 might also include an input/output controller 618 for receiving and processing input from a number of other devices, including a keyboard, mouse, or electronic stylus (not shown in FIG. 6). Similarly, the input/output controller 618 might provide output to a display screen, a printer, or other type of output device (also not shown in FIG. 6). It should also be appreciated that via a connection to the network 650 through a network interface unit 616, the computing architecture might enable the product of the prefetch engine 108 to be distributed.

It should be appreciated that the software components described herein might, when loaded into the CPU 602 and executed, transform the CPU 602 and the overall computer architecture 600 from a general-purpose computing system into a special-purpose computing system customized to facilitate the functionality presented herein. The CPU 602 might be constructed from any number of transistors or other discrete circuit elements, which might individually or collectively assume any number of states. More specifically, the CPU 602 might operate as a finite-state machine, in response to executable instructions contained within the software modules disclosed herein. These computer-executable instructions might transform the CPU 602 by specifying how the CPU 602 transitions between states, thereby transforming the transistors or other discrete hardware elements constituting the CPU 602.

Encoding the software modules presented herein might also transform the physical structure of the computer-readable media presented herein. The specific transformation of physical structure might depend on various factors, in different implementations of this description. Examples of such factors might include, but are not limited to, the technology used to implement the computer-readable media, whether the computer-readable media is characterized as primary or secondary storage, and the like. For example, if the computer-readable media is implemented as semiconductor-based memory, the software disclosed herein might be encoded on the computer-readable media by transforming the physical state of the semiconductor memory. For example, the software might transform the state of transistors, capacitors, or other discrete circuit elements constituting the semiconductor memory. The software might also transform the physical state of such components in order to store data thereupon.

As another example, the computer-readable media disclosed herein might be implemented using magnetic or optical technology. In such implementations, the software presented herein might transform the physical state of magnetic or optical media, when the software is encoded therein. These transformations might include altering the magnetic characteristics of locations within given magnetic media. These transformations might also include altering the physical features or characteristics of locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 might include other types of computing devices, including hand-held computers, embedded computer systems, personal digital assistants, and other types of computing devices known to those skilled in the art. It is also contemplated that the computer architecture 600 might not include all of the components shown in FIG. 6, might include other components that are not explicitly shown in FIG. 6, or might utilize an architecture completely different than that shown in FIG. 6. For example, and without limitation, the technologies disclosed herein can be utilized with multiple CPUS for improved performance through parallelization, graphics processing units ("GPUs") for faster computation, and/or tensor processing units ("TPUs") for implementing big data applications. The term "processor" as used herein encompasses CPUs, GPUs, and TPUs.

In closing, although the various technologies presented herein have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method for training a machine learning classifier, the method comprising:

performing unsupervised machine learning to identify a plurality of clusters in training data describing utilization metrics for a plurality of computing devices;

determining, for each of the plurality of clusters and independent of user input specifying a label to be used in labeling the cluster, whether the cluster is complete or incomplete based on pairs of the utilization metrics;

splitting a first cluster of the plurality of clusters into multiple clusters responsive to determining the first cluster is incomplete; and assigning a cluster label to a second cluster of the plurality of clusters, independent of user input or previously labeled data, responsive to determining the second cluster is complete, wherein the cluster label indicates a probability that the second cluster is anomalous based on a size of the second cluster relative to a size of the training data.

2. The method of claim 1, wherein determining whether each of the plurality of clusters is complete or incomplete comprises comparing differences between the pairs of the utilization metrics included in the cluster to a median difference of the pairs of the utilization metrics included in the cluster.

3. The method of claim 1, further comprising generating a completeness score for each of the plurality of clusters, wherein determining whether each cluster of the plurality of clusters is complete or incomplete is performed based, at least in part, on the completeness score.

4. The method of claim 1, further comprising:

determining whether each of the plurality of clusters have been assigned a cluster label; and responsive to determining that each of the plurality of clusters have been assigned a cluster label, merging at least two of the plurality of clusters into a single cluster.

5. The method of claim 1, wherein assigning a cluster label to the second cluster generates cluster-labeled training data, the method further comprising training the machine learning classifier by performing supervised machine learning on the cluster-labeled training data.

6. The method of claim 5, further comprising assigning incident probability inferences to the plurality of clusters by performing Bayesian learning on the cluster-labeled training data.

7. The method of claim 6, further comprising assigning a remedial action to be triggered to each of the plurality of clusters having an assigned incident probability inference that satisfies a threshold value.

8. The method of claim 5, further comprising:

deploying the machine learning classifier to a production environment for use in identifying production machine metrics as indicating anomalies;

receiving data from the machine learning classifier indicating an instance of the production machine metrics indicates an anomaly;

presenting data identifying the instance of the production machine metrics indicating an anomaly-to-incident likelihood in a user interface; and receiving an indication in the user interface that the instance of the production machine metrics indicates or does not indicate an incident.

9. The method of claim 8, further comprising retraining the machine learning classifier based, at least in part, on the indication.

10. The method of claim 1, wherein splitting the first cluster into multiple clusters is performed using a plurality of computing devices operating in parallel.

11. The method of claim 1, further comprising assigning a remedial action to at least one of the plurality of clusters, wherein the remedial action triggers a device restoration to a recent healthy state.

12. The method of claim 1, further comprising assigning a remedial action to at least one of the plurality of clusters, wherein the remedial action triggers a device reboot.

13. The method of claim 1, further comprising assigning a remedial action to at least one of the plurality of clusters, wherein the remedial action triggers a device reconfiguration.

14. A computer-readable storage medium storing instructions that are executable by one or more computing devices to perform operations comprising:

performing unsupervised machine learning to identify a plurality of clusters in training data describing utilization metrics for a plurality of computing devices;

determining, for each of the plurality of clusters and independent of user input specifying a label to be used in labeling the cluster, whether the cluster is complete or incomplete based on pairs of the utilization metrics;

splitting a first cluster of the plurality of clusters into multiple clusters responsive to determining the first cluster is incomplete;

assigning a cluster label to a second cluster of the plurality of clusters, independent of user input or previously labeled data, responsive to determining the second cluster is complete, wherein assigning the cluster label to the second cluster generates cluster-labeled training data; and training a machine learning classifier by performing supervised machine learning on the cluster-labeled training data.

15. The computer-readable storage medium of claim 14, wherein determining whether each of the plurality of clusters is complete or incomplete comprises comparing differences between the pairs of the utilization metrics included in the cluster to a median difference of the pairs of the utilization metrics included in the cluster.

16. The computer-readable storage medium of claim 14, the operations further comprising generating a completeness score for each of the plurality of clusters, wherein determining whether each cluster of the plurality of clusters is complete or incomplete is performed based, at least in part, on the completeness score.

17. The computer-readable storage medium of claim 14, the operations further comprising:

determining whether each of the plurality of clusters have been assigned a cluster label; and responsive to determining that each of the plurality of clusters have been assigned a cluster label, merging at least two of the plurality of clusters into a single cluster.

18. The computer-readable storage medium of claim 14, the operations further comprising assigning incident probability inferences to the plurality of clusters by performing Bayesian learning on the cluster-labeled training data.

19. The computer-readable storage medium of claim 18, the operations further comprising assigning a remedial action to be triggered to each of the plurality of clusters having an assigned incident probability inference that satisfies a threshold value.

20. A system comprising:

one or more processors; and a computer-readable storage medium storing computer-executable instructions that, when executed by the one or more processors, cause the one or more processors to:

identify a plurality of clusters in training data describing utilization metrics for a plurality of computing devices by performing unsupervised machine learning;

determine, for each of the plurality of clusters and independent of user input specifying a label to be used in labeling the cluster, whether the cluster is complete or incomplete based on pairs of the utilization metrics;

split a first cluster of the plurality of clusters into multiple clusters responsive to determining the first cluster is incomplete;

assign a cluster label to a second cluster of the plurality of clusters, independent of user input or previously labeled data, responsive to determining the second cluster is complete, wherein the cluster label indicates a probability that the second cluster is anomalous based on a size of the second cluster relative to a size of the training data, and wherein assigning the cluster label to the second cluster generates cluster-labeled training data; and train a machine learning classifier by performing supervised machine learning on the cluster-labeled training data.

* * * * *